United States Patent [19]

Sugio et al.

[11] 4,115,369

[45] Sep. 19, 1978

[54] PROCESS FOR CONTINUOUS PRODUCTION OF OXYMETHYLENE POLYMERS

[75] Inventors: Akitoshi Sugio, Ohmiya; Tomotaka Furusawa, Matsudo; Katsumasa Tanaka, Tokyo; Toshikazu Umemura, Tokyo; Hiroyuki Urabe, Tokyo, all of Japan

[73] Assignee: Mitsubishi Gas Chemical Company, Inc., Tokyo, Japan

[21] Appl. No.: 855,905

[22] Filed: Nov. 29, 1977

[30] Foreign Application Priority Data

Nov. 29, 1976 [JP] Japan .................................. 51-142324

[51] Int. Cl.² .............................................. C08G 2/10
[52] U.S. Cl. ...................................... 526/65; 528/249; 528/250
[58] Field of Search ................................ 260/67 FP

[56] References Cited

U.S. PATENT DOCUMENTS

| 3,254,053 | 5/1966 | Fisher | 260/67 FP |
| 3,442,866 | 5/1969 | Seddon et al. | 260/67 FP |

*Primary Examiner*—Lucille M. Phynes
*Attorney, Agent, or Firm*—Wenderoth, Lind & Ponack

[57] ABSTRACT

A process for continuously producing an oxymethylene polymer by continuously polymerizing a starting monomer containing at least 50 mole% of trioxane in bulk in the presence of a catalyst, which comprises feeding the starting monomer into a first-stage polymerization reactor having a self-cleaning action to perform a first-stage polymerization reaction until the conversion reaches 40 to 70%, withdrawing the reaction mixture as a powder from the outlet of the first-stage polymerization reactor, feeding the reaction mixture into a second-stage polymerization reactor having a stirring action to perform a second-stage polymerization reaction until the conversion reaches 95 to 100%, and then withdrawing the polymerization product as a powder from the outlet of the second-stage polymerization reactor.

7 Claims, 9 Drawing Figures

Fig. 1-(A)
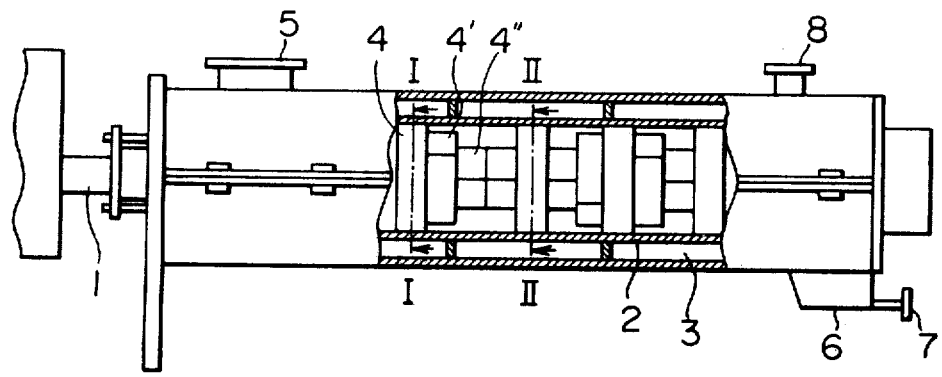
Fig. 1-(B)
I-I.
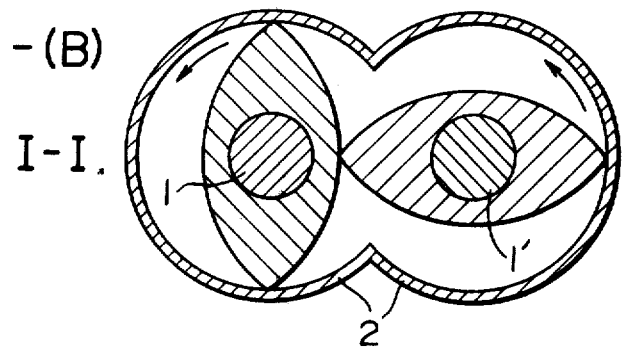
II-II
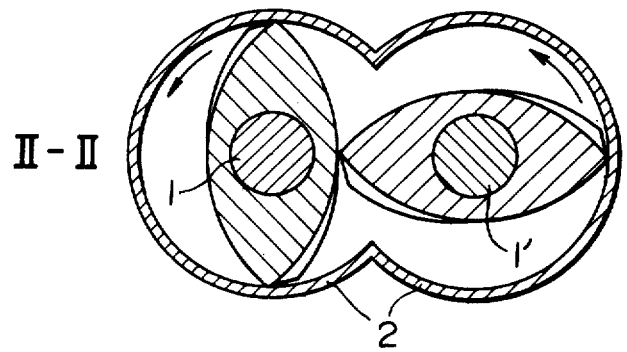

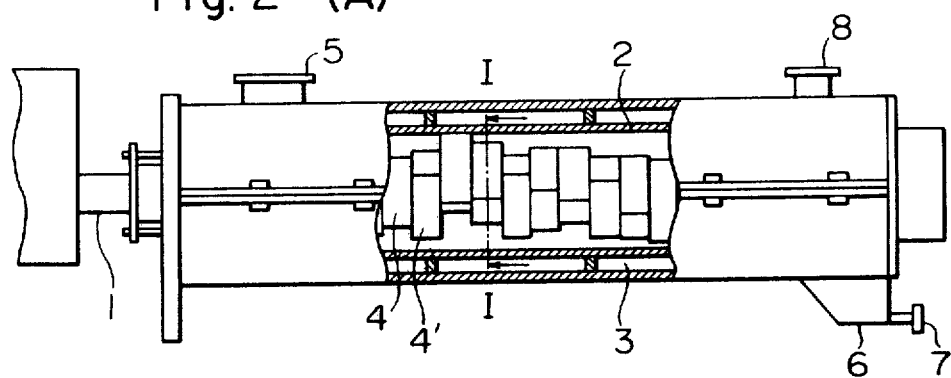
Fig. 2-(A)
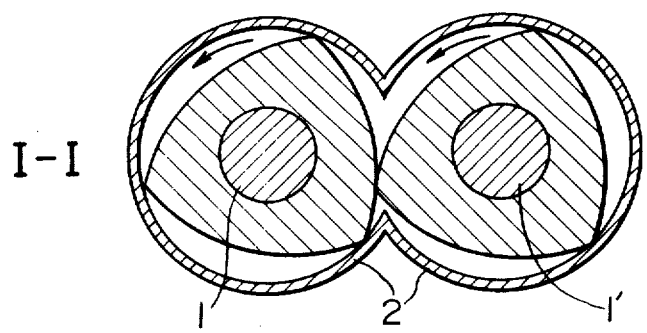
Fig. 2-(B)
I-I

Fig. 3
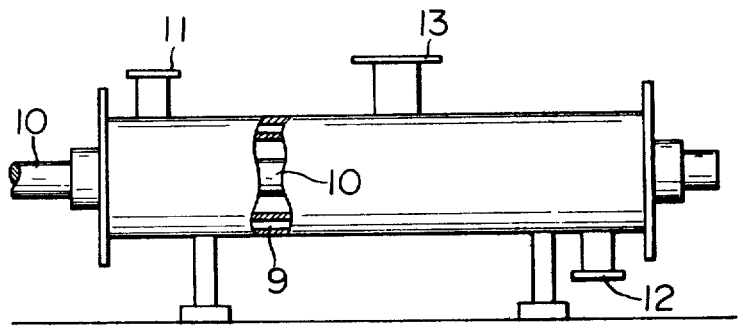
Fig. 4-(A)
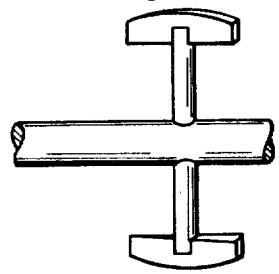
Fig. 4-(B)
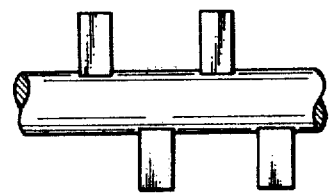
Fig. 4-(C)
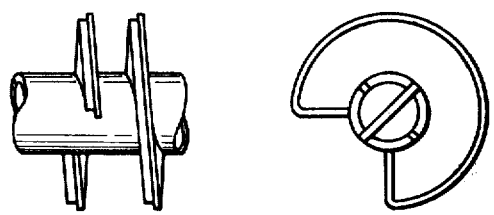
Fig. 4-(D)
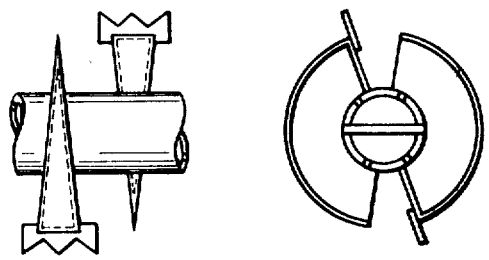

PROCESS FOR CONTINUOUS PRODUCTION OF OXYMETHYLENE POLYMERS

BACKGROUND OF THE INVENTION

This invention relates to a process for continuously producing oxymethylene polymers. More specifically, the invention relates to a process for continuously producing an oxymethylene homopolymer or copolymer by polymerizing trioxane or a monomeric mixture containing at least 50 mole% of trioxane in bulk in the presence of a catalyst.

Various processes for the production of oxymethylene polymers have been known to date. For example, a solution polymerization method which is usually carried out batchwise and comprises blowing a purified formaldehyde gas into an inert organic solvent containing a catalyst is well known as a method for producing an oxymethylene homopolymer. This method, however, has the defect of requiring the troublesome purification of the starting formaldehyde.

On the other hand, a polymerization technique starting from trioxane which is solid and easy to handle has advanced, and various processes have been suggested. One of them is a batchwise polymerization method which comprises adding a catalyst to liquefied trioxane and polymerizing it in bulk. According to this method, the reaction product generally agglomerates with the progress of the quick and vigorous polymerization reaction. Hence, it is not easy to pulverize the final polymer, and the product is difficult to take out. In an attempt to avoid these troubles, a liquid-phase batchwise polymerization method was suggested in which a large amount of an inert solvent is used and the polymerization is performed while maintaining the reaction product in the suspended state. This method requires the recovery of the inert solvent used in large amounts, and the use of much solvent leads to products of low molecular weights, or causes a decrease in the rate of polymerization. For this reason, the liquid-phase batchwise polymerization method is not commercially advantageous. Accordingly, a method of polymerizing trioxane in bulk is usually desired to produce an oxymethylene homopolymer or copolymer.

Various methods and apparatuses for polymerizing trioxane in bulk and obtaining oxymethylene polymers as pulverized products have heretofore been suggested.

For example, Japanese patent publication No. 5234/69 discloses a technique of copolymerizing trioxane and ethylene oxide by using a continuous mixing device which is marketed under the tradename "KO-Kneader" and disclosed in the specification of U.S. Pat. No. 2,505,125. This method involves using a cylindrical barrel which includes a screw provided coaxially with the barrel and having a number of ridges that interrupt the screw thread, and reacting the polymerization mixture which moving the polymerized mixture located at the interrupted portions by teeth which project from the inside surface of the barrel. With this method, however, mixing is insufficient, and the reaction mixture does not well contact the inside surface of the cylinder cooled by an external jacket for temperature adjustment. Consequently, the polymerization temperature rises to cause the volatilization of the monomer and/or comonomer and a satisfactory polyoxymethylene copolymer cannot be obtained.

U.S. Pat. No. 2,442,866 discloses a technique involving the use of a "screw-extruder" consisting of a long cylinder with a pair of meshing parallel screws disposed therein as a polymerization apparatus which can increase the mixing efficiency of the reaction mixture. When molten trioxane is polymerized in the screw extruder, the reaction mixture rapidly agglomerates with the progress of the polymerization. This often causes so high a load that the rotation of the screws fails, and the operation becomes virtually impossible.

As one expedient for removing the defects of the screw extruder, Japanese Laid-Open patent publication No. 84890/76 corresponding to U.S. patent application Ser. No. 514,146 filed Oct. 11, 1974 suggests a technique involving the use of a "self-cleaning" type continuous mixing device having the function of automatically scraping the adhering agglomerated reaction mixture as a polymerization reactor. The polymerization reactor used in this method consists of a long case including a pair of parallel shafts each of which is equipped with many elliptical plates, the elliptical plates being provided such that when the shafts are rotated, the ends of the long axes of the elliptical plates attached to one shaft always rub the surfaces of the elliptical plates attached to the other shaft. The use of such a self-cleaning polymerization reactor is favorable in actual practice because the final product discharged from it has a relatively small particle size, but has the defect that the conversion of monomer is low. Attempts to increase the conversion of monomer in this method have not produced satisfactory results. For example, if the concentration of catalyst is increased, the molecular weight of the final polymer decreases. If the reaction temperature is raised, unusual reactions including depolymerization take place, and the heat generated by these reactions cause the instantaneous volatilization of monomers. After all, satisfactory polymer products cannot be obtained. If the residence time in the mixing device is prolonged, the output of the polymer decreases markedly. In order to increase the hold-up of the mixing device and prolong the residence time, it is necessary to increase L/D (the length-to-diameter ratio). Increasing L/D, however, results in a tremendous increase in the cost of building the device, and also causes operational and maintenance troubles such as the poor contacting of elliptical plates caused by the flexure of the shafts, and the damage of the inside surface of the device caused by the elliptical plates. Thus, a mixing device having a high L/D is not practical.

As is clear from the foregoing description of the prior art, the production of an oxymethylene homopolymer or copolymer from trioxane as a main starting material by bulk polymerization has two important problems to solve, one to prevent the agglomeration of the reaction mixture and obtain the pulverized product, and the other to increase the mixing efficiency of the reaction mixture and raise the conversion of monomer. The prior art techniques, however, have failed to solve the two problems at the same time.

The present inventors made extensive investigations about the continuous bulk polymerization of a starting monomer consisting mainly of trioxane in order to solve the above problems. These investigations led to the conclusion that with the phase change from liquid monomer to solid polymer, the polymer tends to adhere strongly to the reactor wall and the stirrer, and in order to prevent the agglomeration of the reaction mixture and obtain a pulverized polymer, the use of a self-cleaning type polymerization reactor is essential. However, to achieve a high monomer conversion of, say, 95 to 100% intended by the present invention, the residence time of the reaction mixture in the reactor should be adjusted to at least about 40 to 60 minutes. To give such a long residence time, the L/D of the reactor needs to be made very high. Consequently, the method cannot avoid the inherent disadvantages caused by high L/D as described hereinabove. In order to remove this inconsistency, the present inventors furthered their investigations, and found that (1) in the bulk polymerization of a starting monomer comprising trioxane as a main ingredient, the state of the reaction mixture changes depending upon the conversion of monomer, and as a typical example, the reaction mixture is liquid if the conversion is up to about 20%, and it is a slurry at a conversion of about 20 to 30%, in the form of unbaked bread at a conversion of about 30 to 40%, a wet coarse powder at a conversion of 40 to 50%, a non-tacky powder at a conversion of about 50 to 60%, and a hard powder at a conversion of more than about 60%; and (2) the tackiness of the reaction mixture is most outstanding when it is in the form of slurry, and it shows considerable tackiness when it is in the form of unbaked bread, but after the reaction mixture has become a wet coarse powder, it does not show tackiness which is substantially detrimental. From this new observation, the present inventors concluded that to avoid the adhesion of the reaction mixture to the reactor wall and the stirrer, it is not altogether necessary to use an expensive self-cleaning type reactor over the entire period of the polymerization reaction, but the adhesion of the reaction mixture can be effectively prevented by using a self-cleaning type reactor only in the early stage of the reaction, and using a cheaper nonself-cleaning type ordinary reactor equipped with a stirrer in the later stage of the reaction.

The method of performing polymerization using such two types of reactors has increased utility because of the fact described below. In the bulk polymerization of a starting monomer consisting mainly of trioxane, the rate of reaction is high in the early stage of the reaction where the conversion is low, but abruptly decreases with increasing conversion. It has been found by an analysis made by the present inventors of the rate of reaction in a polymerization reaction under certain reaction conditions, a conversion of 70% is achieved after a lapse of 10 minutes, and in order to increase the conversion to almost 100%, a time of at least 80 minutes is required. Under these circumstances, if it is sufficient to advance the polymerization reaction to a conversion which will remove the trouble of the adhesion (in the above-given example, a conversion of about 40%), the residence time of the reaction mixture in the reactor is very short. Hence, even if such a reaction is carried out in a self-cleaning type reactor, the L/D of the reactor is very low, and therefore, the process is fully feasible. From the standpoint of commercially acceptable L/D, it is permissible to carry out the polymerization reaction in a self-cleaning type reactor until the conversion reaches about 70%. However, with increasing conversion, the residence time in the reactor increases abruptly, and the required L/D becomes exceedingly high. It is disadvantageous therefore to perform the polymerization in a self-cleaning type reactor to a conversion of more than 70%. In practice, it is difficult to increase the conversion to at least 90% using the self-cleaning type reactor.

As will be seen from the foregoing statement, in the bulk polymerization of a starting monomer consisting mainly of trioxane, the prevention of the adhesion of the reaction mixture is important in the early stage of the reaction, and the pulverization of a hard powder is important in the later stage of the reaction. Since however, the self-cleaning type reactor has a good function of scraping the adhering polymer, it is very suitable for use in the early stage reaction. On the other hand, because an ordinary reactor including stirring vanes generally permits a very large hold-up as compared with self-cleaning type reactors, it is very suitable for use in the later-stage reaction which requires a longer residence time.

The present invention was accomplished on the new findings of the present inventors described hereinabove. It is an object of this invention to convert a starting monomer containing at least 50 mole% of trioxane continuously to an oxymethylene homopolymer or copolymer by bulk polymerization. Another object of the invention is to substantially complete the conversion of the starting monomer to the polymer. A still another object of the invention is to continuously withdraw an oxymethylene homopolymer or copolymer as a powder after substantial completion of conversion of the starting monomers to the polymer.

SUMMARY OF THE INVENTION

The present invention provides a process for continuously producing an oxymethylene homopolymer or copolymer by continuously polymerizing a starting monomer containing at least 50 mole% of trioxane in bulk in the presence of a catalyst, which comprises feeding the starting monomer into a first-stage polymerization reactor having a self-cleaning action to perform a first-stage polymerization reaction until the conversion reaches 40 to 70%, preferably 40 to 60%, withdrawing the reaction mixture as a powder from the outlet of the first-stage polymerization reactor, feeding the reaction mixture into a second-stage polymerization reactor having a stirring action to perform a second-stage polymerization reaction until the conversion reaches 95 to 100%, and then withdrawing the polymerization product as a powder from the outlet of the second-stage polymerization reactor.

The first-stage polymerization reactor suitable for use in this invention is a reactor comprising a barrel having an external heating or cooling jacket and at least two horizontal stirring shafts inside, wherein each of the horizontal stirring shafts has a plurality of paddles fixed thereto, the paddles having such a shape that when the horizontal stirring shafts are rotated simultaneously in the same direction, the pointed ends of the paddles fixed to one of the horizontal stirring shafts always keep a slight clearance from the inside surface of the barrel or the paddles fixed to the other horizontal stirring shaft, and wherein the reaction mixture in the barrel is moved from the inlet to the outlet of the reactor by the rotation of the paddles.

The second-stage reactor suitable for use in the process of this invention is a reactor having a high heat transmission surface comprising an external heating or cooling jacket and one or a plurality of horizontal stirring shafts inside, wherein a plurality of stirring vanes are fixed to each horizontal stirring shaft, and the reaction mixture within the barrel is slowly stirred by rotation of the stirring vanes.

Usually, the residence time of the reaction mixture is longer in the second-stage reactor than in the first-stage reactor.

BRIEF DESCRIPTION OF THE ACCOMPANYING DRAWINGS

FIG. 1 is a schematic view showing one embodiment of the first-stage polymerization reactor used in the process of this invention in which FIG. 1-(A) shows partly a side elevation of the reactor, and partly a broken-away cross-sectional view for showing the internal structure of the reactor, and FIG. 1-(B) shows the side elevations of the reactor shown in FIG. 1-(A) taken along the lines I—I and II—II;

FIGS. 2-(A) and 2-(B) are similar to FIGS. 1-(A) and 1-(B);

FIG. 3 is a sketch of one embodiment of the second-stage polymerization reactor used in the process of this invention; and FIG. 4 is a view showing various embodiments of the stirring vanes used in the second-stage polymerization reactor.

DETAILED DESCRIPTION OF THE INVENTION

The process of this invention includes a process for producing an oxymethylene homopolymer by polymerizing trioxane alone, and a process for an oxymethylene copolymer by polymerizing a monomeric mixture containing at least 50 mole% of trioxane. In the present specification and claims, the oxymethylene homopolymer and copolymer are sometimes referred to generically as oxymethylene polymers. The comonomer used to produce the oxymethylene copolymer is a cyclic ether or cyclic acetal which gives an oxyalkylene unit to the main chain of the polymer, and, for example, is a compound expressed by general formula (I). The amount of comonomer is at most 50 mole%, preferably 0.4 to 40 mole%, more preferably 0.4 to 10 mole%.

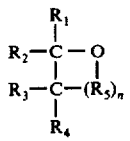

(I)

wherein $R_1$, $R_2$, $R_3$ and $R_4$ are identical or different, and represent a hydrogen atom, an alkyl group, or a haloalkyl group, and $R_5$ represents a methylene or oxymethylene group or a methylene or oxymethylene group substituted with an alkyl group or a haloalkyl group in which case n is an integer of 0 to 3, or $R_5$ represents the grouping $-(CH_2)_mOCH_2-$ or $-(O-CH_2-CH_2)_mO-CH_2-$ in which case $n$ is equal to 1, and $m$ is an integer of 1 to 3. The alkyl group mentioned has 1 to 5 carbon atoms and may be substituted with up to 3 hlaogen atoms, especially chlorine atoms.

Suitable cyclic acetals or cyclic ethers are ethylene oxide, glycol formal and diglycol formal. Propylene oxide and epichlorohydrin can also be used. Cyclic formals of long-chain $\alpha,\omega$-diols such as butanediol formal or hexanediol formal are also suitable.

Known cationic polymerization catalysts can be used as the polymerization catalyst. In particular, at least one of boron fluoride, boron fluoride hydrate and a coordination compound of an organic compound containing an oxygen or sulfur atom and boron fluoride is used in the form of gas or a solution in a suitable organic solvent. The coordination compounds of boron fluoride, especially boron fluoride etherate and boron fluoride butylate, are preferred polymerization catalysts.

The process of this invention is directed to the continuous production of oxymethylene polymers by bulk polymerization. If desired, a relatively small amount of an inert anhydrous medium may be used for the polymerization. The use of the inert medium makes it possible to perform the reaction smoothly because the latent heat caused by the evaporation of the medium can directly control the heat of polymerization and the heat generated by shearing.

The novel feature of the process of this invention is that the polymerization reaction is divided into two stages, and the first-stage reaction is carried out in a reactor having a self-cleaning action until the conversion reaches 40 to 70%, preferably 40 to 60%, and the second-stage reaction is carried out in a reactor having a stirring action until the conversion reaches 95 to 100%. The self-cleaning reactor used in the first-stage reaction of the process of this invention is known, and for example, U.S. Pat. No. 3,195,868 discloses the use of this device as a continuous mixer. The above-cited Japanese Laid-Open patent publication No. 84890/76 describes the technique of continuous bulk polymerization of trioxane by using this device. The reactor having a stirring action used in the second-stage reaction in the process of this invention is also known. However, the process of the continuous bulk polymerization of a starting monomer containing trioxane as a main ingredient in which the polymerization reaction is performed in two stages to achieve specified conversions and different reactors specified are used in the two stages to achieve predetermined conversions, has not been known heretofore. The process of the present invention successfully affords oxymethylene polymers at high conversion while avoiding the trouble of agglomeration of the reaction mixture. Since a very high conversion is obtained in the process of this invention, it is not necessary, for example, to wash the reaction product after polymerization to recover the unreacted material. Now that no washing is performed, an operation of solvent recovery is also unnecessary. Accordingly, the present invention provides a very simplified process for producing oxymethylene polymers.

These advantages of the present invention are ascribable to the fact that the present invention has selected reaction conditions which conform well to the peculiar behavior in bulk polymerization of a starting mixture containing trioxane as a main ingredient. In the first-stage reaction specified in the process of this invention, the starting mixture in the liquid state is formed into a slurry in the presence of a catalyst and becomes solid, and unless a self-cleaning type reactor is used, the reaction mixture will become an agglomerated mass which requires subsequent pulverization. The secondstage reaction does not require such a scraping action as to use a self-cleaning type reactor, and a reactor which has such a stirring effect as to prevent the coalescing of the fine powders with each other suffices.

The present invention is described further by referring to the accompanying drawings. FIGS. 1 and 2 show typical examples of a first-stage reactor suitable for use in the process of this invention. The firststage reactor shown in these figures is a continuous kneader which exerts a self-cleaning action on its internal surface upon the rotation of shafts 1 and 1'. A barrel 2 has one or a plurality of heating or cooling jacket 3 capable of independent temperature control. The shafts 1 and 1' in the barrel 2 have such a structure as to permit the passage of a heating or cooling liquid through their insides. The two stirring shafts 1 and 1' have provided therein paddles 4, 4' . . . of special shapes such as a cross-section of a concave lens of a triangular or polygonal section. The side surfaces of the paddles may be flat or helical. By the combination of the paddles 4, 4', 4" . . . , transporting, mixing and returning according to changes in the phase of the reaction mixture can be performed. The paddles may be fixed to the shafts 1 and 1' in such a manner that the rotating phases of the paddles are progressively changed to 45°, 60° or 90°. The two shafts 1 and 1' rotate in the same direction, and in the same cross-section, the pointed ends of the paddles 4 fixed to one shaft 1 always keep a slight clearance from the inside surface of the barrel 2 and the end surfaces of the paddles 4' in the other shaft 1' during rotation. Hence, the reaction mixture incesssntly receives compression and expansion by incessant volume changes of the space formed between the paddles 4, 4' . . . and the barrel 2, and is vigorously mixed. The clearance between the pointed end of the paddle 4, 4' . . . and the barrel 2 is preferably not more than 1% of the diameter of each paddle, and the clearance between the pointed end of the paddle fixed to the one shaft and the side end surface of the paddle fixed to the other shaft is not more than 5 times the above clearance.

One or a plurality of jacket 3 for heating or cooling the reaction mixture are provided externally of the barrel 2. A feed opening 5 is provided at one end of the barrel. The ingredients of the starting material may be mixed immediately before introduction into the feed opening 5, or may be separately introduced. After introduction, the starting mixture is polymerized within short periods of time while being transported, kneaded and pulverized, and the polymerization product is discharged from a discharge outlet 6 at the other end. The discharge outlet 6 is an ordinary opening for the discharging of the polymerization product as a powder. If desired, a dam 7 may be provided to control the hold-up of the product within the reactor. By-product gases, inert medium gases, etc. which occur during the polymerization are removed out of the reaction system through a vent 8.

As is clear from the above structure, since the above first-stage reactor has a larger reaction volume per unit length of shaft than the screw-extruder type apparatus, the residence time of the reaction mixture in the apparatus can be prolonged, and the discharging ability of the reactor is greater. Moreover, the shear volume between the inside surface of the barrel 2 and the pointed ends of the paddles 4, 4' . . . is smaller than in the screw-extruder type apparatus. The first-stage reactor performs vigorous mixing in the circumferential direction of rotation, and is therefore suitable for mixing of the starting material with the catalyst or pulverizing the product. In addition, by selecting combinations of various forms of paddles, the first-stage reactor has adaptability to phase changes ranging from liquid, slurry to powder. Adhesion of the polymer layer to the inside surface of the barrel and the surfaces of the paddles is extremely reduced, and the heat of reaction or the heat of shearing can be effectively removed by cooling the barrel externally and the shafts internally. If desired, a combination of two or more self-cleaning type reactors with a very low L/D may be used as the first-stage reactor. To remove the heat more effectively, a small amount of an inert anhydrous medium is used, and the heat is removed by the latent heat of evaporation of this medium. In this case, too, the heat can be removed very effectively because the evaporation surface area per unit reaction volume is large.

If desired, a screw may be secured to the forward side (i.e., the material feed opening side) of the horizontal stirring shafts to facilitate the delivery of the starting mixture. This is generally not necessary, however, since the delivering of the starting mixture can be sufficiently achieved by helical paddles. If a screw is desired to be fitted, it should be secured to a very small limited part of the material feed side of the horizontal stirring shafts. It should not be attached to the rear side (i.e., the discharge outlet side) of the horizontal stirring shafts.

The second-stage reactor has the structure schematically shown in FIG. 3. The residence time of the reaction mixture in this reactor should be at least two times that in the first-stage reactor. Hence, the second-stage reactor has two or more times as large a volume as the first-stage reactor, and permits a large hold-up. The stirring vanes have the shapes illustrated in FIG. 4 (A, B, C, D). These stirring vanes are used either singly or in combination of two or more. The reactor includes at least one stirring shaft equipped with these stirring vanes, but needs not to possess self-cleaning property as the first-stage reactor. The second-stage reactor is a closed, horizontal stirring device having high heat transmission surface in which a heating or cooling fluid may be passed through an external jacket 9 for the barrel and through the inside of stirring shaft 10.

The reaction mixture containing unreacted compounds which is fed from a feed opening 11 and shows a conversion of 40 to 70% is powdery so that it scarcely adheres to the reactor wall or the like. Hence, the reactor requires a great stirring effect rather than a self-cleaning effect. The oxymethylene polymer is slowly stirred by the stirring vanes (A, B, C, D in FIG. 4) attached to the stirring shaft 10, and without agglomeration, is discharged in a fine powder form from a discharge outlet 12. Cases generated during the polymerization are removed out of the system from a vent 13. The product thus discharged shows a conversion of 95 to 100%.

The polymerization reaction is started by continuously feeding the starting material and catalyst from the feed opening 5 of the first-stage reactor, as shown in FIGS. 1 and 2. The polymerization in the first-stage reactor is performed at a temperature of 0° to 150° C., preferably 50° to 100° C., The residence time is 0.5 to 30 minutes, preferably 1 to 10 minutes. The reaction mixture turns from a free-flowing liquid to a viscous slurry and vigorous mixing and shearing action prevent the formation of a solid agglomerated mass. Lastly, the product is discharged as a finely divided powder. Since the conversion in the first-stage reaction is 40 to 70%, the powder discharged is an oxymethylene polymer containing 30 to 60% of unreacted monomer.

The resulting oxymethylene polymer containing 30 to 60% of unreacted monomer is immediately fed into the second-stage reactor shown in FIG. 3 under an atmosphere of an inert gas. It is maintained at a temperature of 0° to 130° C., preferably 10° to 80° C., for a residence time of 5 to 60 minutes, and by gentle stirring, the oxymethylene polymer powder is aged. After a lapse of the predetermined residence time, high-molecular-weight oxymethylene polymer with a conversion of 95 to 100% is discharged from the discharge outlet 12. Since the polymer discharged is a fine powder with a high conversion, the reaction is stopped by immediately adding a polymerization stopper. By adding a stabilizer, the product is stabilized against heat and is ready for marketing.

The following examples illustrate the practive of the present invention. All parts and percentages in these examples are by weight unless otherwise specified.

EXAMPLE 1

A starting mixture consisting of 100 parts of trioxane, 2.5 parts of ethylene oxide, 2.0 parts of cyclohexane and 0.02 mole, per mole of the trioxane, of boron trifluoride-diethyl etherate was fed at a rate of 34 g per minute into a feed opening of a self-cleaning type first-stage reactor of the structure depicted in FIG. 1. The reaction temperature at the feed portion was 60° C., and the residence time of the mixture in the reactor was about 6 minutes. The rotating speed of the screw was 200 rpm. From the discharge outlet, a powder was discharged. The powder was a copolymer containing 50% of the unreacted monomers (conversion 50%). The copolymer was immediately fed into a second-stage reactor of the structure shown in FIG. 3 under an atmosphere of an inert gas. Pins for stirring were secured helically to the stirring shaft of the second-stage reactor. The copolymer was maintained in this reactor at a reaction temperature of 65° C., and slowly stirred by rotating the stirring shaft at a speed of 20 rpm. It was thus aged until the polymerization was completed. After a residence time of 30 minutes, a fine powdery polymerization product containing less than 2% of unreacted monomers was obtained from the discharge outlet. Triphenyl phosphine was added to the resulting polymer in an amount of 2 moles per mole of the catalyst used thereby to deactivate the catalyst. After about 10 hours' continuous operation, a polymer having an intrinsic viscosity [$\eta$], as measured at 60° C. in p-chlorophenol containing 2% $\alpha$-pinene, of 1.43 to 1.45 dl/g was steadily obtained in a yield of 98.5 to 99.5%.

To the resulting polymer were added 0.5 part of Irganox 259 (registered trademark), 0.2 part of dimeric acid polyamide, and 0.1 part of calcium hydroxide, and without washing, they were melt-kneaded at 200° C. for 20 minutes under an atmosphere of an inert gas by a small-sized melt-kneader to stabilize the polymer. The stabilized polymer had an intrinsic viscosity [$\eta$] of 1.45 dl/g, and a weight loss speed $K_{222}^{air}$, by heat decomposition at 222° C. in air, of 0.0002% by weight/min.

EXAMPLE 2

A starting mixture consisting of 100 parts of trioxane, 3.5 parts of 1,3-dioxepane, 2 parts of cyclohexane and 0.022 mole, per mole of the trioxane, of boron trifluoride diethyl etherate was fed into a self-cleaning type first-stage reactor of the type shown in FIG. 1 at a rate of 34 g per minute. The rotating speed of the screw was adjusted to 200 rpm. The reaction temperature was 60° C., and the residence time of the mixture in the reactor was about 6 minutes. A powder was discharged from the discharge outlet. The powder was a copolymer containing 40% of unreacted monomers (conversion 60%).

The copolymer was immediately sent to a second-stage reactor shown in FIG. 3 under an atmosphere of an inert gas. In this reactor, the reaction temperature was maintained at 65° C., and the polymer was slowly stirred by rotating the stirring shaft at a speed of 20 rpm and aged until the polymerization was completed. After a residence time of 30 minutes, a fine powdery polymerization product containing less than 1% of unreacted monomers was obtained from the discharge outlet. Immediately, triphenyl phosphine was added in an amount of 2 moles per mole of the polymerization catalyst used, and the mixture was immediately fed to a monoaxial screw extruder by a powder feeder. Within the hopper of the extruder, 0.5 part of Irganox 259 (registered trademark), 0.2 part of polyvinyl pyrrolidone and 0.1 part of calcium hydroxide were added and mixed with the polymer. The mixture was fed into monoaxial extruder maintained at a resin temperature of 200° C., and melted. The molten resin was immediately fed into a twin screw extruder from the die head of the monoaxial extruder. The temperature of the twin extruder was eadjusted so that the resin temperature would become 200° C. By maintaining the resin for 15 minutes at a reduced pressure of 10 torr, the resin was stabilized. The unstable oxymethylene ends decomposed, and recovered from a vent together with a part of the solvent and the unreacted monomers. A stabilized white resin was extruded as a strand from the die head. The strand was immediately pelletized to form a marketable product. The resulting copolymer had an intrinsic viscosity [$\eta$] of 1.43 dl/g and a weight loss speed $K_{222}^{air}$, by heat decomposition at 222° C. in air, of 0.0001% by weight/min. A molded article of this product had the following properties.

| Properties | ASTM | Unit | Values |
|---|---|---|---|
| Tensile strength at yield, ⅛" | D-638 | kg/cm$^2$ | 560 |
| Elongation at break, ⅛" | D-638 | % | 70 |
| Flexural strength, ¼" | D-790 | kg/cm$^2$ | 800 |
| Izod impact strength, notched, ⅛" | D-256 | kg . cm/cm$^2$ | 60 |
| Tensile impact strength | D-1822 | kg . cm/cm$^2$ | 80 |
| Heat distortion temperature, ¼", 264 psi | D-648 | ° C | 100 |

COMPARATIVE EXAMPLE 1

The procedure of Example 1 was repeated except that the operating conditions were adjusted so that the residence time of the reaction mixture in the first-stage reactor became about 4 minutes. A product in the form of unbaked bread was obtained from the discharge outlet. The product was a copolymer containing 65% of the unreacted monomers (conversion 35%). The product was fed into a second-stage reactor, and by adjusting the residence time, the aging reaction was performed until the polymerization was substantially completed. After continuously performing the operation for about 5 hours, an unusual torque was exerted on the rotating shaft of the second-stage reactor, and the operation failed. When the second-stage reactor was disassembled, it was found that the product polymer intimately adhered to the surface of the inner wall. It was ascertained that the operational failure was due to the frictional resistance between the adhering polymer and the stirring pins.

The results show that when the conversion in the first-stage reactor was not maintained at 40% or more, the continuous operation of the process for long periods of time is impossible.

COMPARATIVE EXAMPLE 2

In the method of Example 1, the polymerization was carried out under the same conditions except that the speed of feeding the starting mixture into the first-stage reactor was decreased to about 17 g per minute, and the temperature at the feeding section was increased to 90° C. The powder which came from the discharge outlet was a copolymer containing 28% of the unreacted monomers (conversion 72%).

During continuous operation for about 10 minutes, an unusual torque was exerted on the rotating shaft of the first-stage reactor. The operation was interrupted, and the first-stage reactor was disassembled. It was found that the product intimately adhered to the surface of the inner wall and the paddles. The results show that continuous operation failed when the conversion in the first-stage reaction was maintained at more than 70%.

What we claim is:

1. A process for continuously producing an oxymethylene polymer by continuously polymerizing a starting monomer containing at least 50 mole% of trioxane in bulk in the presence of a catalyst, which comprises feeding the starting monomer into a first-stage polymerization reactor having a self-cleaning action to perform a first-stage polymerization reaction until the conversion reaches 40 to 70%, withdrawing the reaction mixture as a powder from the outlet of the first-stage polymerization reactor, feeding the reaction mixture into a second-stage polymerization reactor having a stirring action to perform a second-stage polymerization reaction until the conversion reaches 95 to 100%, and then withdrawing the polymerization product as a powder from the outlet of the second-stage polymerization reactor.

2. The process of claim 1 wherein the first-stage polymerization reactor is a reactor comprising a barrel having an external heating or cooling jacket and at least two horizontal stirring shafts inside, in which each of the horizontal stirring shafts has a plurality of paddles fixed thereto, the paddles have such a shape that when the horizontal stirring shafts are rotated simultaneously in the same direction, the pointed ends of the paddles fixed to one of the horizontal stirring shafts always keep a slight clearance from the inside surface of the barrel or the paddles fixed to the other horizontal stirring shaft, and in which the reaction mixture in the barrel is moved from the inlet to the outlet of the reactor by the rotation of the paddles.

3. The process of claim 1 wherein the second-stage polymerization reactor is a reactor having a high heat transmission surface comprising an external heating or cooling jacket and one or a plurality of horizontal stirring shafts inside in which a plurality of stirring vanes are fixed to each horizontal stirring shaft and the reaction mixture within the barrel is slowly stirred by the rotation of the stirring vanes.

4. The process of claim 1 wherein the reaction temperature in the first-stage reactor is 0° to 150° C.

5. The process of claim 1 wherein the residence time of the reaction mixture in the first-stage reactor is 0.5 to 30 minutes.

6. The process of claim 1 wherein the reaction temperature in the second-stage reactor is 0° to 130° C.

7. The process of claim 1 wherein the residence time of the reaction mixture in the second-stage reactor is 5 to 60 minutes.

* * * * *